United States Patent [19]

Pritchard

[11] 3,872,498

[45] Mar. 18, 1975

[54] COLOR INFORMATION TRANSLATING SYSTEMS

[75] Inventor: Dalton Harold Pritchard, Princeton, N.J.

[73] Assignee: RCA Corporation, New York, N.Y.

[22] Filed: Apr. 13, 1973

[21] Appl. No.: 350,777

[30] Foreign Application Priority Data

Apr. 19, 1972 Great Britain .................... 18036/72

[52] U.S. Cl. ................ 358/21, 178/DIG. 23, 358/4, 358/30

[51] Int. Cl. ............................................ H04n 9/02

[58] Field of Search ........ 178/5.2 R, 5.4 R, 5.4 CD, 178/DIG. 23; 358/4, 11, 21, 30, 37

[56] References Cited

UNITED STATES PATENTS

| | | | |
|---|---|---|---|
| 2,636,937 | 4/1953 | Fredendall et al. | 178/5.4 R |
| 3,700,793 | 10/1972 | Borsuk et al. | 178/6.8 |

FOREIGN PATENTS OR APPLICATIONS

| | | | |
|---|---|---|---|
| 859,081 | 1/1961 | Great Britain | 178/5.2 R |

OTHER PUBLICATIONS

Toshiba Review, July 1971, pp. 26–29.
N.H.K. Laboratories, Note S/N 135, Sept. 1970, Fujio and Miyahara.

*Primary Examiner*—Robert L. Richardson
*Attorney, Agent, or Firm*—Eugene M. Whitacre; William H. Meagher

[57] ABSTRACT

A color encoding format is disclosed wherein a chrominance signal in the form of a modulated subcarrier is buried in the midband of a wider band luminance signal. Comb filtering of the luminance signal midband prepares "troughs" in the luminance signal frequency spectrum. The chrominance signal is complementarily comb filtered to confine it to components falling in the vacated troughs of the luminance signal frequency spectrum. An illustrative use of this encoding format is in video disc recording. In subsequent processing of the encoded signals, as, for example, in playback of the video disc, the buried subcarrier chrominance signal may be separated from the midband luminance components by comb filtering, with substantial assurance of freedom from all crosstalk between the shared band components (including freedom from crosstalk by "diagonal" components). Systems (e.g., for recorder use) are shown for direct encoding into the buried subcarrier format, and for transcoding from NTSC format into buried subcarrier format. Systems (e.g., for player use) are also shown for transcoding from buried subcarrier format to NTSC format.

25 Claims, 11 Drawing Figures

COLOR INFORMATION TRANSLATING SYSTEMS

This invention relates generally to color information translating systems, and particularly to encoding, transcoding and decoding systems for use in conjunction with the conveying or storing and recovery of color image information.

In a variety of systems concerned with the use of image information, it is often desired that information concerning the coloring (i.e., hue and saturation) of the respective image elements be conveyed and/or preserved in addition to basic information concerning the brightness of the respective image elements. Provision of such supplemental coloring information is a major concern of the present invention, which will be described in the particular context of one type of image information system; viz., a video disc system. It is recognized, however, that the principles of the present invention are applicable to use in other types of image information systems; e.g., video tape recorders, CATV systems, picturephone systems, etc.

In US. Pat. Application No. 126,772, filed Mar. 22, 1971, for Jon K. Clemens and entitled "Information Records and Recording/Playback Systems Therefor", video disc recording and playback systems of a variable capacitance form are disclosed. In an arrangement therein disclosed, an information track incorporates geometric variations in the bottom of a spiral groove in a disc, the surface of which comprises conductive material covered with a thin coating of dielectric material. Variations in the capacitance presented between a conductive electrode on a tracking stylus and the conductive material of the disc occur as the disc is rotated by a supporting turntable; the capacitance variations are sensed to recover the recorded information.

In one particularly successful format employed for the groove bottom information track in practice of the Clemens invention, depressed areas extending across the groove bottom alternate with non-depressed areas, with the frequency of alternation varying with the amplitude of video signals subject to recording. The form of the recorded signal is thus a carrier frequency modulated in accordance with video signals. In a preferred technique for recording the information on a video disc master, an electron beam subject to intensity modulation in accordance with FM carrier signals, impinges upon light sensitive material in the master disc groove bottom, so that subsequent development leaves the desired relief pattern in the groove bottom.

Where it is desired to provide capability for color image reproduction from the information recorded on the video disc, one straightforward approach is to frequency modulate the picture carrier with a composite color television of the familiar NTSC format (employed for color television broadcasting in such countries as the United States and Japan). In the NTSC format, coloring information is added to a brightness-representative video signal through the use of a color subcarrier (at a frequency of 3.579545 MHz., hereinafter referred to as 3.58 MHz. for the sake of simplicity) which is effectively phase modulated in accordance with hue and amplitude modulated in relation to saturation. The color subcarrier signal represents the sum of 3.58 MHz. subcarrier wave of a first phase amplitude modulated in accordance with a first color-difference signal and a 3.58 MHz. subcarrier wave of a second phase, in quadrature with the first phase, amplitude modulated in accordance with a second color-difference signal.

When the unmodified NTSC format is employed for the signals used to frequency modulate the carrier in the above-described video disc system, several difficulties are encountered. Certain practical limitations in the recording process as to the highest instantaneous frequency readily recordable lead to limitations on the frequeny deviation range to be associated with modulation of the picture carrier. The relatively high frequency location of the color subcarrier and its sidebands in the NTSC format thus results in a relatively low modulation frequency to frequency deviation ratio which tends to lower the signal-to-noise ratio attainable for the color signals. An additional serious problem is the development of undesired beats when using the unmodified NTSC format with its high frequency location for color information.

To appreciate the nature of the aforesaid beat problem, one must recognize that a difficulty encountered with the described recording of an FM carrier signal in the disc groove bottom is the tendency for a baseband signal to accompany the recorded FM carrier signal. Illustrative of a cause for such accompaniment is a tendency for the average depth of a slot to vary slightly in proportion to the closeness of spacing of slots, i.e., in proportion to the instantaneous frequency recorded, whereby there is a component of capacitance variation sensed during playback that varies in accordance with the baseband video signal employed to frequency modulate the picture carrier.

With baseband signal frequencies thus liable to appear in signals recovered from the disc during playback, beats can occur between the baseband signals and the FM signals. With an unmodified NTSC format placing the color subcarrier and its sidebands at the high end of the baseband, color signal presence can result in production of annoying beats of frequencies falling within the passband of the player's FM demodulator output, unless the range of instantaneous frequencies occupied by the FM signal is pushed considerably above the high end of the baseband. In view of the previously noted practical limitations on highest instantaneous frequency conveniently recordable, location of the picture carrier deviation range appreciably higher than the band of frequencies occupied by the baseband signal in an unmodified NTSC format is not readily available as a solution to the noted beat problems.

A satisfactory and readily realizable solution to the noted beat problems (as well as the noted signal-to-noise ratio problem) is provided, however, through application of the principles of the present invention to the color signal recording and recovery systems. Pursuant to such principles, a modulated color subcarrier (which may, for example, be of the general form employed in the NTSC system) is not placed at the high end of the luminance signal video band as in the NTSC system, but rather is "buried" within the video band, i.e., with the color subcarrier frequency chosen to be significantly lower than the NTSC subcarrier frequency value of 3.58 MHz., An illustrative choice being in the vicinity of 1.53 MHz., with the color subcarrier sidebands extending ± 500 KHz thereabout and with the luminance signal band extending well above the highest color subcarrier sideband frequency (to 3 MHz., for example).

The precise frequency of the subcarrier is chosen to be offset from a multiple of the line frequency ($f$H) associated with the video signal by a fraction of the line frequency (preferably by $f_H/n$, where $n$ is a small integer greater than one). A particularly advantageous offset choise is a half line frequency ($f_H/2$) offset, although other offset choices may be appropriate under special circumstances (as for example, where a PAL form is chosen for the subcarrier, and a quarter line frequency $-f_H/4$ — offset is suitable). An illustrative subcarrier frequency choice incorporating a $f_H/2$ offset is (195/2) $f_H$ (or approximately 1,534,091 Hz., when the line frequency corresponds to the U.S. standard for color television broadcasting of 15,734.26 Hz.).

To avoid annoying crosstalk effects, the luminance signal is comb filtered over the band of frequencies which is to be shared with the subcarrier and its sidebands; i.e., effectively a series of troughs are developed in the frequency spectrum of the luminance signal in which the subcarrier components may be buried. Additionally, it is desirable that the modulated color subcarrier signal ("chrominance signal") is also comb filtered (in a complementary manner to that employed for the luminance signal) to effectively confine the chrominance signal to components that will fall in the troughs of the frequency spectrum of the comb filtered luminance signal. With the illustrative choice of half line frequency offset, the appropriate comb filter characteristic to be employed in preparing troughs in the luminance signal spectrum is one with recurring peaks at multiples of line frequency and recurring nulls at odd multiples of half the line frequency; the appropriate comb filter characteristic for the chrominance signal is the complement (with recurring peaks at odd multiples of half the line frequency and recurring nulls at multiples of line frequency).

By the illustrative location of the subcarrier at approximately 1.53 MHz., one may provide a reasonable bandwidth for the color sidebands (e.g., ± 500 KHz. about the subcarrier frequency, $f_s'$) and yet retain a moderately wide band (e.g., 0–1 MHz.) at the low end of the signal spectrum which will be occupied solely by luminance signal components. Over the latter band of frequencies, the luminance signal is held free from loss of signal components.

When luminance signals and chrominance signals, prepared in the above described manner, are combined, a composite signal is formed which may be recorded in the previously mentioned video disc recording system and subsequently recovered with substantial avoidance of the previously mentioned beat problems and with reasonable assurance of an acceptable signal-to-noise ratio. With provision of appropriate comb filter apparatus in the video disc player, the chrominance and luminance signal components occupying the shared band (e.g., approximately 1–2 MHz.) may be accurately separated from each other for application to suitable utilization circuitry.

In subsequent use of the chrominance signal components to supply the coloring information for an image reproduction, spurious coloring effects due to midband luminance components are substantially avoided, the avoidance being due to the described judicious application of comb filtering techniques. Also, in subsequent use of the luminance signal components to supply the brightness information for an image reproduction, spurious dot patterns due to the brightness effects of the midband chrominance signal components are substantially avoided, the avoidance being due to the described judicious application of comb filtering techniques. The present invention thus provides a system where coloring information may be conveyed and/or stored and recovered, while sharing a midband location with luminance signal components, with substantial freedom from spurious coloring and brightness effects. The achievement is particularly significant when one considers (a) that, for typical scenes, luminance components are likely to appear in the midband region with greater energy content than in the upper band to which the usual NTSC format consigns the chrominance signal, wherefore a severe problem of luminance crosstalk into color might normally be expected to accompany midband sharing; and (b) the dot pattern associated with the display of subcarrier components at midband frequencies is significantly coarser and thus more visible than the dot pattern associated with the display of subcarrier components at the highband frequencies assigned in the usual NTSC format, wherefore a severe problem of chrominance crosstalk into luminance might normally be expected to accompany midband sharing.

Where the color image information to be recorded initially appears in NTSC encoded form, the principles of the present invention may be embodied in transcoding apparatus, i.e., apparatus translating the color image information from NTSC encoded form to the buried subcarrier form described above. In accordance with an illustrative embodiment of such apparatus, a composite signal of NTSC form is passed via a high pass filter to the input of a comb filter having pass bands centered about odd multiples of half the line frequency and nulls at multiples of the line frequency. The NTSC chrominance signal selectively passed by the comb filter is heterodyned in a modulator with unmodulated oscillations of an appropriate frequency (illustratively, approximately 5.11 MHz.) to obtain a difference frequency product that falls in the desired midband location for buried subcarrier operation. The NTSC composite signal (above the low band of frequencies to be solely occupied by luminance signals) is also subjected to the effect of a comb filter having passbands centered about multiples of the line frequency and nulls at odd multiples of half the line frequency in order to obtain high frequency luminance signals from the band shared with the NTSC chrominance signals, and also to prepare the aforementioned troughs in the midband spectrum of the luminance signal into which the frequency-shifted subcarrier components may be buried. A new composite signal is then formed by combining the frequency-shifted subcarrier components (obtained by selecting the aforesaid difference frequency product of the modulator) with the combed midband and high frequency luminance signals and the uncombed low band luminance signals. Illustratively, a 1H delay line (responsive to the aforementioned high pass filter output), together with means for subtractively combing the delay line input and the delay line output, may serve as the first-mentioned (chrominance) comb filter, while the same 1H delay line, together with means for additively combining the delay line output with the composite signal input of the high pass filter, may serve as the second-mentioned (luminance) comb filter. With the high pass filter characteristic chosen to pass frequencies falling in both the to-be-shared midband and the previously-shared high band, the output of the additive combining means comprises combed midband and high band luminance signal components together with uncombed low band luminance signal components.

Pursuant to another embodiment of such NTSC signal transcoding apparatus, the full band NTSC composite signal is applied to a comb filter of the chrominance type described above, and the combed output is then passed through a high pass filter that rejects frequencies in the not-to-be-shared low band. The high pass filter output provides an input to modulator apparatus having the previously described function of shifting combed chrominance signals to a new midband location. The high pass filter output is also subtractively combined with an uncombed full band composite signal (illustratively obtained from the output of the 1H delay line element of the chrominance comb filter). The output of the last mentioned subtractive combing means includes uncombed low band luminance signal components and combed midband and high band luminance signal components. This embodiment is thus illustrative of use of a subtractive process for obtaining a luminance type of comb filter. That is, the effect of a luminance comb filter (having passbands centered about multiples of the line frequency and nulls at odd multiples of half the line frequency) is obtained by subtracting the output of a chrominance comb filter (having passbands centered about odd multiples of half the line frequency and nulls at multiples of the line frequency) from an uncombed composite signal.

Where the color image informatin to be recorded is available in "raw," unencoded form, the principles of the present invention may be applied to direct encoding apparatus as contrasted with "transcoding" apparatus, e.g., to directly translating information from color separation form (such as a set of simultaneous red, green and blue primary color signals) to the desired buried subcarrier format (without any intervening appearance in NTSC encoded form).

Pursuant to an illustrative embodiment of such direct encoding apparatus, conventional matrixing apparatus may be employed to derive a luminance signal (Y) and a pair of color-difference signals (e.g., B-Y and R-Y) form a set of primary color signals (R, G and B; derived, for example, from a film scanner). A chrominance signal is formed by modulating a first phase of unmodulated oscillations at the desired buried subcarrier frequency with one color-difference signal, modulating a second phase of such oscillations (in quadrature with the first phase) with the other color-difference signal, and additively combining the modulator outputs. The chrominance signal thus formed is comb filtered to reject components falling at multiplies of the line frequency. The luminance signal output of the matrixing apparatus is high pass filtered to reject frequencies falling in the not-to-be-shared low band. The high pass filter output is comb filtered to reject components falling at odd multiples of half the line frequency. The two comb filter outputs are additively combined with uncombed low band luminance signal components (obtained by lowpass filtering the luminance signal output of the matrixing apparatus) to form a composite signal in the desired buried subcarrier format.

Pursuant to another embodiment of such direct encoding apparatus, the order in which comb filtering and high pass filtering is effected for luminance components may be reversed; i.e., a full band luminance signal may be appropriately comb filtered and the comb filter output passed to the input of a high pass filter which rejects frequencies in the not-to-be-shared low band. In such an arrangement (as in the second described embodiment of transcoding apparatus), the uncombed low band luminance signal components, which are to be combined with combed luminance and chrominance signal components to form the desired composite signal, may conveniently be derived from the output of the 1H delay line element of the luminance comb filter. As will be explained in more detail subsequently, the use of delayed low band luminance signal components (in contrast to the use of undelayed low band luminance signal components) in forming the composite signal can provide certain display advantages when particular practices are followed in the player apparatus.

In the playback of a video disc recording of color image information encoded in the above-discussed buried subcarrier format, the manner in which the recovered information should be processed will differ in dependence upon the nature of the player apparatus. For example, where the player apparatus itself incorporates image display equipment, direct decoding of the chrominance signal (after separation by appropriate comb filtering) at the buried subcarrier frequency may be appropriate. However, where the player apparatus does not incorporate image display equipment but rather is intended as a form of attachment or auxiliary equipment for use, for example, with a separate color television receiver, it is believed desirable that the player incorporate a form of transcoding apparatus which may serve to translate the information recovered in buried subcarrier format to a signal format which the color television receiver is designed to handle (e.g., translation to the NTSC encoded form).

In an illustrative application of the principles of the present invention to player transcoding apparatus, a composite signal recovered upon disc playback is applied to a chrominance comb filter having passbands centered about odd multiples of half the line frequency and nulls at multiples of the line frequency. Heterodyning of the comb filter output with unmodulated oscillations of appropriate frequency (e.g., approximately 5.11 MHz., which is the sum of the illustrative buried subcarrier frequency of 1.53 MHz. and the NTSC subcarrier frequency of 3.58 MHz.) is employed to shift the separated chrominance signal to the highband location for which the receiver's chrominance signal processing circuitry is designed. A luminance comb filter (having passbands centered about multiples of the line frequency and nulls at odd multiples of half the line frequency) also responds to the recovered composite signal, but is suitably modified to allow a passage to the output without combing of components falling in the unshared low band. The luminance comb filter output is combined with the shifted chrominance signal to form a new composite signal suitable for receiver processing. As in previously discussed recorder transcoding apparatus, the luminance and chrominance comb filters may share the same 1H delay line apparatus.

In the video disc playback environment, a problem may be encountered in effecting desired processing of recovered signals due to undesired frequency variations of the recovered signals. That is, for a variety of reasons, including turntable rotational speed variations, record warp, inaccurate record centering, et al., there may be undesired variations of the speed of relative motion between the pickup stylus and the record groove that may result in spurious variations of the recovered signal frequencies. Thus, for example, the color subcarrier sideband frequencies in the recovered composite signal may be subject to "jitter" about their otherwise expected locations in the frequency spectrum, with a similar jitter causing displacment of the luminance signal component frequency locations.

Pursuant to an optional aspect of the present invention, the operation of the player transcoding (or decoding) apparatus may be rendered less sensitive to such undesired jitter by employing a form of a comb filter that incorporates two 1H delay lines; the two 1H delay line form can provide a "comb" characteristic with broader rejection notches than is obtainable with a one 1H delay line form, and, accordingly, more accurate luminance chrominance separation (e.g., less luminance-chrominance crosstalk) can be obtained in the face of a given degree of component frequency jitter.

In a copending application of John G. Amery and Robert W. Jorgenson, entitled "Signal Translating Apparatus" and filed concurrently herewith, player transcoding apparatus arrangements are disclosed in which heterodyning of the recovered buried subcarrier composite signal (or a portion thereof) with local oscillations precedes comb filtering. The source of local oscillations, however, is caused to have substantially the same jitter as the recovered signal components, (by, for example, rendering the local oscillation source responsive to the frequency variations suffered by the color synchronizing burst which accompanies the buried subcarrier chrominance signal). The product of heterodyning with such local oscillations is substantially jitter-free, and comb filtering of that product may be carried out with crosstalk freedom relatively independent of the original jitter.

Illustrative of player transcoding aparatus embodying the principles of the present invention and incorporating the jitter correction approach of the aforesaid copending application is an arrangement in which the entire buried subcarrier composite signal recovered during playback is heterodyned with local oscillations in a modulator. The local oscillations are nominally at a frequency (e.g., approximately 5.11 MHz.) corresponding to the sum of the nominal buried subcarrier frequency (e.g., 1.53 MHz.) and the subcarrier frequency desired for receiver operations (e.g., 3.58 MHz.), but are subject to frequency variations substantially corresponding to the jitter suffered by the recovered signal components. The modulator output is applied via a vestigial sideband filter to the input of a chrominance comb filter (i.e., one having multiplier pass bands centered about odd multiples of half the line frequency and nulls at multiples of the line frequency). The vestigial sideband filter limits the comb filter input primarily to the difference frequency products of modulation (i.e., primarily the lower sideband of the modulated local oscillation frequency) although also passing the local oscillation frequency and a very limited portion of the sum product (upper sideband), corresponding to a low frequency portion of the composite signal's unshared low band.

Suitable bandpass filtering of the comb filter output provides a chrominance signal in the frequency band (e.g., 3.58 MHz. ± 500 KHz.) desired for delivery to the receiver. Subtraction of this chrominance signal from an uncombed version of the modulator output provides an output substantially free of chrominance signal components; illustratively, where a two 1H delay line form of comb filter has been employed, the uncombed input to the subtractor is derived from the junction of the cascaded pair 1H delay lines. The output of the subtractor is applied to an envelope detector; the detector output is low pass filtered and additively combined with the separated chrominance signal to form the new composite signal desired for receiver use.

A variety of additional forms of player transcoding arrangements are also feasible involving variations of the above-described illustrative embodiments, as will be subsequently developed herein.

Pursuant to a further optional feature of the present invention, the same delay line apparatus employed for comb filtering may be associated with additional circuitry for controlling aperture correction of the luminance signal.

Objects and advantages of the present invention will be readily recognized by those skilled in the art upon a reading of the following detailed description and an inspection of the accompanying drawings in which:

FIG. 1*a* illustrates in block diagram form transcoding apparatus embodying the principles of the present invention, the apparatus being suitable for transcoding an NTSC encoded signal to buried subcarrier form for use in video disc recording systems;

FIG. 1*b* illustrates in block diagram form apparatus for performing a transcoding function complementary to that of the FIG. 1*a* in accordance with further principles of the present invention, the apparatus being suitable for video disc player use in transcoding signals from a buried subcarrier form to the general form of an NTSC encoded signal;

FIG. 2*a* illustrates a modification of the apparatus of FIG. 1*a*, which provides a variation of a peaking effect obtained with the FIG. 1*a* apparatus;

FIG. 2*b* illustrates a modification of the apparatus of FIG. 1*b* to incorporate a vertical aperture correction function;

Figure 1A:
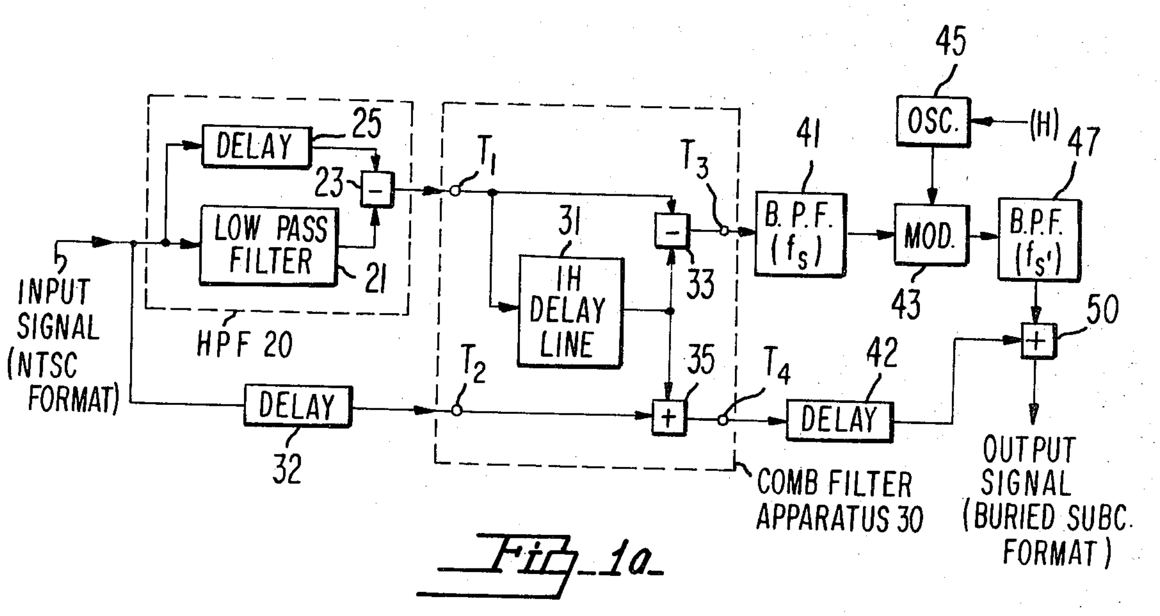

In the recorder transcoding apparatus of FIG. 1*a*, an input color image signal in NTSC encoded form is applied to a high pass filter 20. Illustratively, the high pass filter 20 is of the form employing the combination of a low pass filter 21 for the input signal, and a combiner 23 for subtractively combining the low pass filter output with an unfiltered version of the input signal passed via a delay element 25 having a delay chosen to substantially match the delay imposed by low pass filter 21 on signals passing therethrough. The cutoff frequency of high pass filter 20 corresponds to the cutoff frequency of its low pass filter component 21 (idealized filters being assumed herein for ease of presentation) and desirably is just below the lower sideband of the output subcarrier. For an illustrative example, where the buried subcarrier frequency ($f_s'$) choice is the aforementioned half line frequency offset example in the vicinity of 1.53 MHz. and the chrominance signal bandwidth choice is $f_s' \pm 500$ KHz., a suitable choice for the cutoff frequency ($f_{co}$) of high pass filter 20 is approximately 1MHz.

The output of highpass filter 20, comprising input signal components having frequencies above $f_{co}$, is passed to an input terminal $T_1$ of comb filter apparatus 30. The comb filter apparatus 30 includes a 1H delay line element 31 (i.e., an element which delays signals applied to its input for a time duration corresponding to a period at the line scanning frequency of the video signals being handled), which receives an input from terminal $T_1$. Signal combiner 33 subtractively combines the output of the 1H delay line 31 with the input signals appearing at terminal $T_1$ to provide a first comb filter output signal at output terminal $T_3$.

It should be appreciated that the subtractive combination of the delay line input and output results in provision of a comb filter characteristic of the previously mentioned chrominance comb filter form (i.e., having multiple passbands centered about odd multiples of half the line frequency and nulls at multiples of the line frequency). The chrominance comb filter output signal at terminal $T_3$ is passed to a bandpass filter 41, having a pass band centered about the input signal subcarrier frequency $f_s$ (3.579545 MHz., or approximately 3.58 MHz. for the illustrative NTSC encoding) and a bandwidth appropriate to the desired output chrominance signal bandwidth (e.g., $f_s \pm 500$ KHz.).

The output of bandpass filter 41 is supplied to a modulator 43 for heterodyning with oscillations of a frequency corresponding to the sum of input and output subcarrier frequency ($f_s + f_s'$), provided by an oscillator 45. The difference frequency products of modulation are selectively passed by a bandpass filter 47 coupled to the output of modulator 43. The passband of filter 47 is centered about the buried subcarrier frequency ($f_s'$) and has the desired output chrominance signal bandwidth (e.g., $f_s' \pm 500$ KHz.).

A comb filter characteristic complementary to that provided at terminal $T_3$ of filter apparatus 30 may be obtained by additively combining (as contrasted with the subtractive combining performed by element 33) the output of 1H delay line 31 with its input. Such additive signal combining is performed by signal combiner 35, with the signal to be combined with the delay line output derived, however, from the input of high pass filter 20 (rather than its output at terminal $T_1$) and passed via a delay element 32 (having a delay corresponding to the delay imposed by delay element 25). The output of combiner 35 appearing at output terminal $T_4$ comprises uncombed components of the input signal falling in the frequency band below $f_{co}$, and input signal components, in a frequency band above $f_{co}$, which have been combed in accordance with a comb filter characteristic of the previously mentioned luminance comb filter form (i.e., having multiple pass bands centered about multiples of the line frequency and nulls at odd multiples of half the line frequency).

The output of combiner 35 is applied via delay element 42 to combiner 50 for addition to the chrominance signal output of band pass filter 47 to form a new composite signal in buried subcarrier format, suitable for use in video disc recording as previously indicated.

It is important to note that in operation of the above-described transcoding apparatus the comb filter apparatus 30 has performed several functions which contribute to the successful utilization of the buried subcarrier format. A first function performed is one of component separation: i.e., (a) selection of chrominance signal components to the relative exclusion of luminance signal components, in the signal output at terminal $T_3$; and (b) selection of luminance signal components to the relative exclusion of chrominance signal components, in the signal output at terminal $T_4$.

The availability of comb filter techniques to achieve such relative separation of the chrominance and luminance signal components of an encoded signal of the NTSC type has long been known in the art, this having been the subject matter, for example, of U.S. Pat. No. 2,729,698, issued on Jan. 3, 1956 to Gordon L. Fredendall.

Use of the separation function in the system under discussion (1) enables the application of chrominance signal components to modulator 43 to effect their shift to the midband location desired for recording purposes, with the assurance that there will not be a concomitant shift of high frequency luminance components of the NTSC encoded signal that fall at or near multiples of the line frequency, and (2) enables retention of all or a portion of such high frequency luminance components for inclusion in the output signal (as by passage from terminal $T_4$ to the output combiner 50), with the assurance that such inclusion will not be accompanied by the inclusion of chrominance signal components falling at near odd multiples of half the line frequency in their original high band location (undesired for recording purposes, in view of previously discussed beat problems).

It will be noted that for the discussed separation functions, there is no need to effect combing of the NTSC encoded signal below the lowest sideband frequency (e.g., approximately 2 MHz.) associated with its 3.58 MHz. color subcarrier. However, pursuant to the principles of the present invention, there is a further function to be performed by comb filter apparatus 30 (in addition to the discussed separation functions), which further function leads to the desirability of effecting input signal combing in a band of frequencies below the lowest NTSC color sideband frequency. In particular, it is desired that combing of the luminance signal be provided over the midband (e.g., 1–2 MHz.) to be shared with the buried subcarrier sidebands passed by filter 47; for this purpose, the cutoff frequency $f_o$ of high pass filter 20 in the FIG. 1a arrangement is lowered sufficiently to permit passage of signal components falling in the to-be-shared midband.

To appreciate the purpose served by the above mentioned precombing of the midband of the luminance signal prior to its combination with the frequency shifted chrominance signals, it is necessary to understand that, depending upon picture content (i.e., the nature of the image being scanned), the luminance signal may contain components having frequencies falling at or near odd multiples of half the line frequency. Information (e.g., edges and other transitions) oriented at an angle to both deflection axes results in the production of video signal components that depart from the condition of being multiplies of the line frequency. To the extent that the presence of such diagonal information results in the presence of luminance components falling within the pass bands of a chrominance comb filter in the aforesaid Fredendall arrangement, for example, full separation of chrominance and luminance components is not effected by the combing, and some luminance crosstalk into color still occurs, for example.

In the arrangement of FIG. 1*a*, diagonal luminance signal components that thus pass through the chrominance comb filter to terminal $T_3$, and also fall within the passband of bandpass filter 41, are indeed shifted down to the passband of filter 47 along with the desired chrominance signal components, and remain inseparable companions of the chrominance signal components, so as to ultimately produce the effects of luminance crosstalk into color. The effects of this crosstalk are, however, not viewed as intolerable, especially since (a) the effects of such crosstalk are equally present in operation of conventional color TV receivers of the NTSC type (along with the crosstalk effects of the more prevalent luminance signal components falling at multiples of the line frequency), and (b) the effects of such crosstalk are likewise present even in operation of NTSC color TV receivers employing comb filter separation for improved crosstalk freedom.

However, the foregoing comments relative to the tolerability of diagonal luminance component crosstalk into color directly pertain to such components as are encountered in the high frequency band in which chrominance signal components lie the usual NTSC format. In the buried subcarrier format of the present invention, another aspect of diagonal luminance component crosstalk is to be considered: i.e., the effect of crosstalk from diagonal luminance components falling within the midband which is to be shared with buried subcarrier form of chrominance signal. To allow crosstalk into color from midband diagonal luminance components is believed to be a more consequential matter than permitting such crosstalk from highband diagonal luminance components because of the general likelihood of energy content for midband components relative to highband components.

Thus, the significant consequence in the FIG. 1a arrangement of extending comb filtering of the luminance signal through the to-be-shared midband is substantially precluding crosstalk into color from midbald diagonal luminance components. That is, the output of midband luminance comb filter appearing at terminal $T_4$ is substantially purged of components falling at or near odd multiples of half the line frequency. In subsequent use of the new composite signal formed by combiner 50, one may employ comb filtering to separate the buried subcarrier chrominance signal components with confidence that such components may be obtained therefrom substantially free from accompaniment by crosstalk-producing midband diagonal luminance components.

Figure 1B:
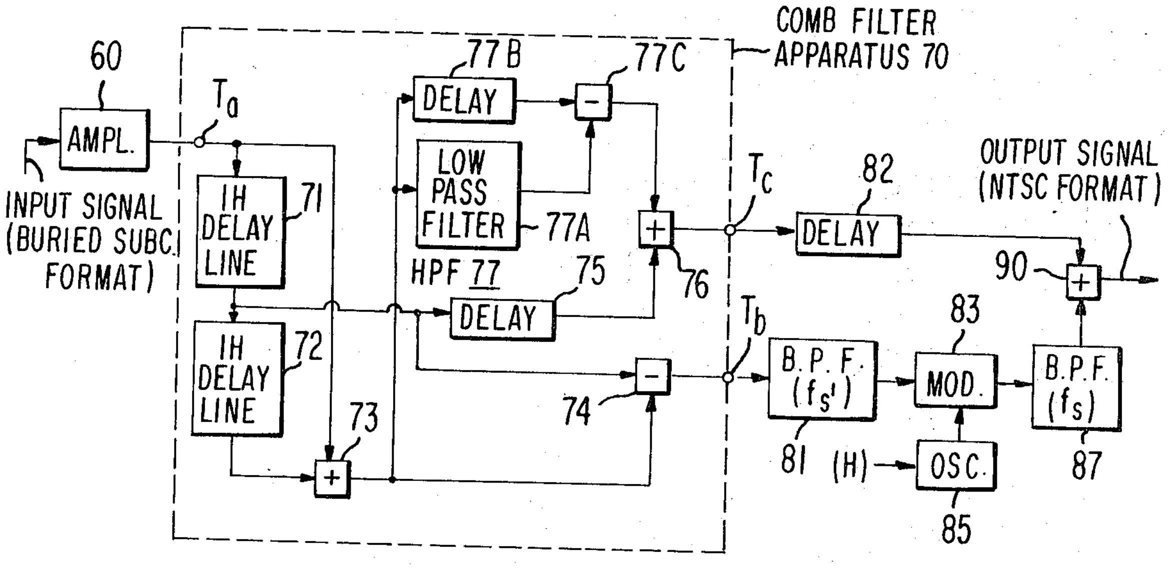

FIG. 1*b* is illustrative of equipment for such subsequent use of composite signals formed by the equipment of FIG. 1*a*, and represents, for example, transcoding apparatus that may be employed in a video disc player, responding to a buried subcarrier composite signal recovered from a video disc during playback and converting such signals to an NTSC encoded form for suitable application to a color television receiver.

In the FIG. 1b apparatus, an input composite signal of buried subcarrier format (derived, for example, from play back of a video disc) is applied via an amplifier 60 to the input terminal $T_a$ of comb filter apparatus 70. For illustrative purposes, the comb filter apparatus 70 (in this example as well as succeeding examples of player equipment) is shown as being of the type employing two 1H delay lines (71,72) in cascade; as previously mentioned, this type of comb filter offers particular advantages relative to the single 1H delay line type with regard to the shape of the rejection notches in the comb like frequency characteristic obtained, rendering the ability to accurately separate luminance and chrominance signal components less dependent on the frequency stability of the components of the input composite signal (such frequency stability being particularly difficult to maintain in the video disc player environment, as previously noted). However, it should be recognized that single 1H delay line versions of each example may alternatively be employed, particularly where appropriate frequency correction techniques may be used to ease the instability problem, or, for example, in other use environments where component frequency stability is inherently not a difficult problem.

To obtain a comb filter characteristic of the aforementioned chrominance comb filter type (i.e., passbands at odd multiples of half the line frequency, and nulls at multiples of line frequency), the signal at the midpoint of the delay line array (i.e., at the output of delay line 71) is subtractively combined in combiner 74 with sum of the input signal (at terminal $T_a$) and the output signal (i.e., the signal output of delay line 72). The summing of input and output signals is effected by combiner 73; the input and output signal contributions must be properly weighted in amplitude relative to the midpoint signal to achieve the desired cancellation of line frequency multiple signal components, and for the illustrated arrangement, the appropriate weighting ratio is 1:2. Thus, it should be assumed that combiner 73 incorporates suitable attenuation means to provide an output corresponding to the sum of a half amplitude input signal and a half ampliitude output signal.

The output of the subtractive combiner 74 appears at filter output terminal $T_b$ and is applied to a bandpass filter 81, having a passband centered about the buried subcarrier frequency, $f_s'$ (illustratively, 1.53 MHz.), with a bandwidth appropriate to selection of the sidebands of the buried subcarrier signal (e.g., $f_s' \pm 500$ KHz.). The output of filter 81 thus corresponds to the chrominance signal buried in the midband of the input composite signal to the substantial exclusion of lowband and midband luminance signal components, and this selected chrominance signal is shifted upward in frequency to a band desired for output signal use by heterodyning in modulator 83 with the output of oscillator 85. Illustratively, the latter operates at a frequency of $f_s + f_s'$ (e.g., 3.58 MHz. + 1.53 MHz. = 5.11 MHz.) so that the difference frequency product of modulation falls in a band centered about the desired output subcarrier frequency, $f_s$ (e.g., the NTSC subcarrier frequency, 3.58 MHz.). Bandpass filter 87, with a passband of the appropriate width (e.g., $f_s \pm 500$ KHz.) centered about $f_s$, is coupled to the output of modulator 83 and selectively passes the desired difference frequency modulation product.

The comb filter apparatus 70 of the FIG. 1*b* arrangement further includes a combiner 76 for additively combining the midpoint signal (the output of delay line 71) with the weighted sum of input and output signals (i.e., with the output of combiner 73) to provide a comb filter of the aforementioned luminance comb filter type (i.e., passbands at multiples of the line frequency and nulls at odd multiples of half the line frequency). The output of combiner 73 is applied to combiner 76, however, via a high pass filter 77 so as to avoid combining of the unshared lowband portion of the luminance signal spectrum. Illustratively, the high pass filter (HPF) 77 is of a form similar to that shown for HPF 20 in FIG. 1*a*, employing the combination of a low pass filter (LPF) 77A for the applied signal, and a combiner 77C for subtractively combining the low pass filter output with an unfiltered version of the applied signal passed via a delay element 77B (substantially matching the delay of LPF 77A). Similar to HPF 20, the cutoff frequency of HPF 77 is preferably chosen to fall just below the lowest buried subcarrier sideband frequency (e.g., $f_{co} = 1$ MHz.). The midpoint signal is applied to combiner 76 via a delay element 75 (substantially matching the delay of delay element 77B).

The output of additive combiner 76 appears at filter output terminal $T_c$, and comprises uncombed lowband luminance signal components (falling at frequencies below $f_{co}$) and combed midband and highband luminance signal components, to the substantial exclusion of midband chrominance signal components. The output of combiner 76 is applied to a delay element 82, which delays the luminance signal components for a time period chosen to substantially equalize the total delay of the luminance signal components with the delay of the chrominance signal components (suffered primarily in passing from terminal $T_b$ to the output of BPF 87). The luminance signal output of delay element 82 is combined with the frequency-shifted chrominance signal output of BPF 87 in combiner 90 to provide the composite output signal, illustratively of NTSC encoded form suitable for processing by a color television receiver of normal NTSC type.

In construction of the transcoding apparatus of FIG. 1a and of FIG. 1*b*, the 1H delay lines (31, 71, 72) may illustratively be of a wideband ultrasonic type available from the Corning Glass Co., the modulators (43, 83) may conveniently be of doubly balanced form, the short delay element (25, 32, 42, 75, 77B, 82) may illustratively be appropriate lengths of coaxial line, and the oscillators (45, 85) may illustratively be of a start-stop variety suitably controlled by a line frequency signal (H) related to the composite signal being processed.

Figure 2A:
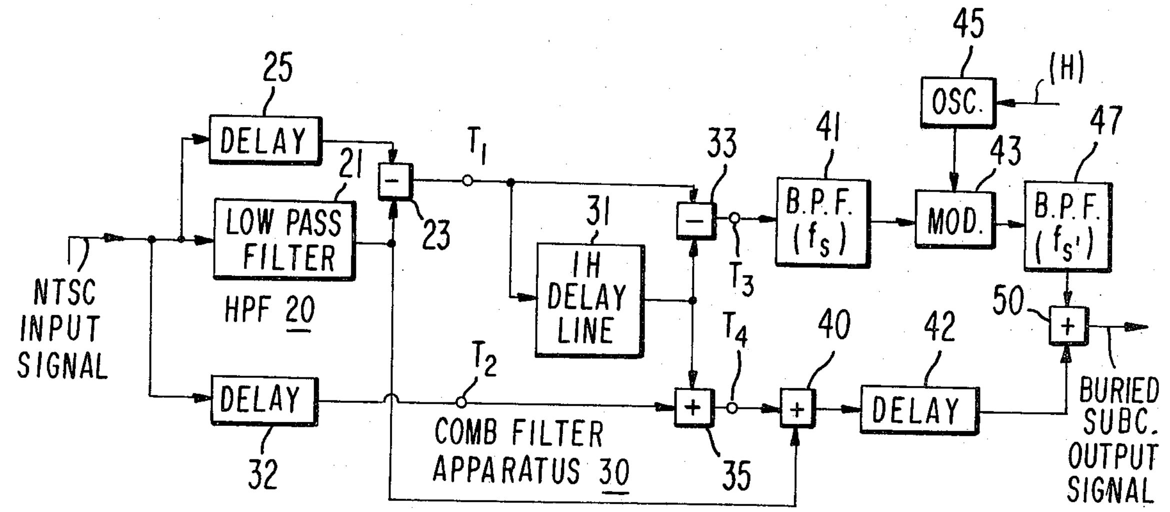

FIG. 2*a* illustrates a modification of the recorder transcoding apparatus of FIG. 1*a*, wherein an additional combiner 40 is interposed between the luminance comb filter output terminal $T_4$ and the input of delay element 42. Combiner 40 additively combines the signal at terminal $T_4$ with the signal output of low pass filter 21 (the LPF element of HPF 20), supplying the sum to the input of delay element 42. The remaining apparatus of FIG. 2*a* corresponds directly to that of FIG. 1*a*.

To appreciate the function performed by the additional combiner 40, it is necessary to first point out that in the transcoder form illustrated in FIG. 1*a*, a type of horizontal aperture correction (i.e., high frequency peaking) of the luminance signal is inherently provided. The weighting of inputs to adder 35 appropriate to the single 1H delay line type of luminance comb filter (i.e., appropriate to achieving the desired component cancellation at odd multiples of half the line frequency) is 1:1; thus, full amplitude versions of the delay line input and output are supplied to adder 35, and these reinforce (at multiples of the line frequency) to effectively provide double amplitude luminance signal components (at the passband peaks) for component frequencies above the cutoff frequency ($f_{co}$) of HPF 20. However, for luminance signal components in the unshared lowband (below $f_{co}$) there is no contribution from the delay line output; i.e., lowband luminance signal components are supplied to adder 35 only from terminal $T_2$. As a consequence, luminance components in the combed midband and highband are subject to a peak response effectively twice the response level for the uncombed lowband components.

If high peaking of this magnitude, location in the spectrum (determined by choice of $f_{co}$), and rolloff shape (determined by rolloff of the characteristic of LPF 21) is indeed found desirable, the FIG. 1*a* arrangement may be used unmodified. If it is rather desired to remove this peaking of the highs, the FIG. 2*a* modification is appropriate. The input to combiner 40 from LPF 21 supplements the lowband component from terminal $T_2$ to effectively double the lowband response level equalizing it to the peak response in the combed spectrum portion. If some degree of the noted highs peaking is desired, short of the 2:1 peaking provided by the unmodified FIG. 1*a* arrangement, the FIG. 2*a* modification may be employed, with means for effeccting some desired degree of attenuation of the output of LPF 21 associated with adder 40. By making such an attenuator variable, a facility can be provided by variable highs peaking of the luminance signal.

Figure 2B:
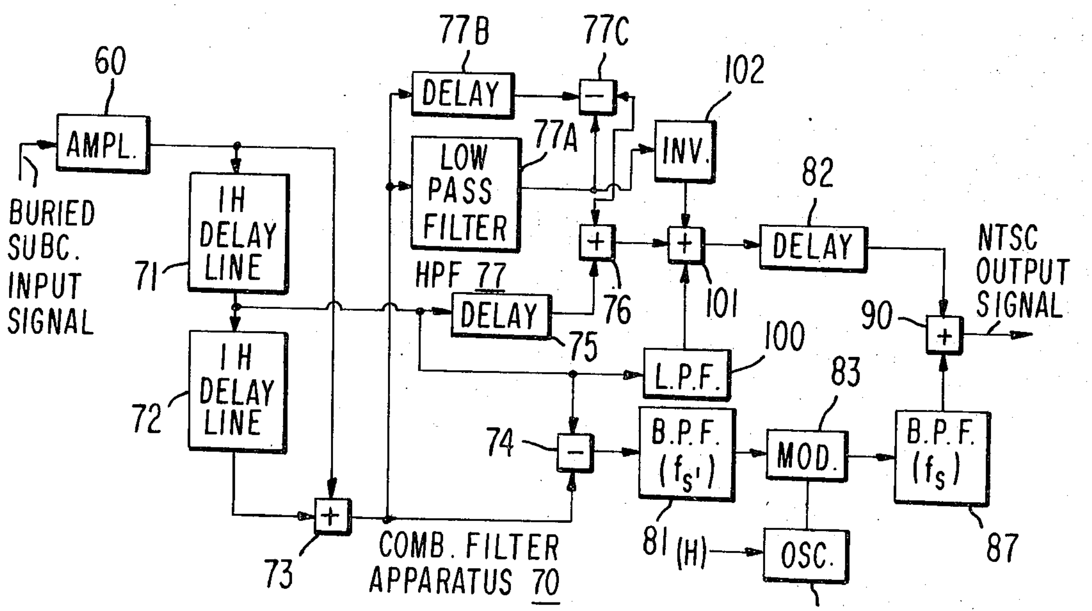

A form of high frequency peaking comparable to that discussed above in connection with FIG. 1*a* is also inherently provided in the player transcoding apparatus of FIG. 1*b*. That is, for the luminance comb filter output at terminal $T_c$, the response level in the uncombed low band (supplied only via the midpoint signal) is half the peak response in the combed midband and highband (supplied via the half sum of input and output signals, as well as via the midpoint signal). FIG. 2*b* illustrates a modification of the FIG. 1*b* player transcoding apparatus which incorporates, interalia, means for removing (or reducing) the noted high frequency peaking. In the modified structure, an additional combiner 101 is interposed between filter output terminal $T_c$ and the input to delay element 82; combiner 101 additively combines the signal at terminal $T_c$ with the output of an additional low pass filter 100 (having a cutoff frequency similar to that of LPF 77A) to which the midpoint signal is applied. The output of LPF 100 supplements the midpoint signal contribution to adder 76 for lowband frequencies so as to raise the lowband response level as desired. As in FIG. 2*a*, incorporation of a variable attenuator for the supplemental signal will provide a facility for variable high frequency peaking.

The only other departure from the FIG. 1*b* arrangement shown in FIG. 2*b* involves the coupling of the output of the low pass filter 77A (the LPF element of HPF 77) via a phase inverter 102 to adder 101. The effect of these added connections is to introduce a degree of vertical aperture correction (i.e., vertical detail enhancement); control of the magnitude of the supplemental signal from inverter 102, as by use of a variable attenuator in the coupling to combiner 101, will provide means for varying the amount of vertical aperture correction introduced. Confinement of this supplemental signal to frequencies in the unshared lowband (as by the illustrated derivation thereof from the output of LPF 77A) is appropriate to avoid undoing of the desired comb filtering above $f_{co}$.

FIGS. 2*a* and 2*b* have been illustrative of the manner in which control of horizontal and vertical aperture correction effects may be associated with the comb filtering arrangements of the present invention. To avoid overcomplicating theh presentation of additional embodiments, specific application of these aperture correction features to subsequently described embodiments will not be undertaken, but the skilled worker should readily recognize comparable manners whereby the subsequently described embodiments may be adapted to incorporate the aperture correction control features of FIGS. 2*a* and 2*b*.

Figure 3:
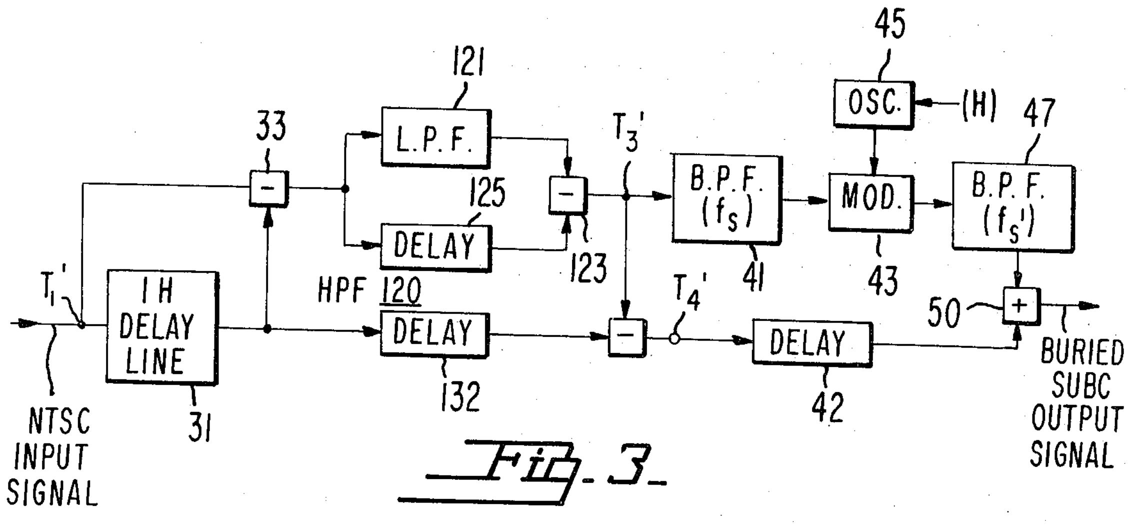
FIG. 3 illustrates another variation of the recorder transcoding apparatus of FIG. 1*a;*

FIG. 3 is illustrative of a useful variation of the recorder transcoding apparatus of FIG. 1*a*, in which, inter alia: (a) the sequence of highpass filtering and comb filtering employed in the course of forming a desired chrominance comb filter is reversed relative to that of FIG. 1*a;* and (b) the desired luminance comb filter characteristic is obtained by a subtractive process.

In the FIG. 3 arrangement, the input composite signal, illustratively of NTSC encoded form, is applied in full to 1H delay line 31. Combiner 33 subtractively combines the input and output of delay line 31 to provide an output combed over the full band (with passbands centered at odd multiples of half line frequency, and nulls at multiples of line frequency). High pass filter 120 selectively passes only those components of the combed output that fall above the unshared low band. HPF 120 illustratively comprises a lowpass filter 121, delay element 125 and subtractive combiner 123, disposed in a configuration similar to that of previously described HPF 20 and with a similar $f_{co}$. The output of subtractive combiner 123, appearing at terminal $T_3'$, corresponds to that previously described as appearing at terminal $T_3$ in FIG. 1*a*, and is operated upon by BPF 41, modulator 43 and BPF 47, as in FIG. 1*a*, to develop the desired frequency-shifted buried subcarrier chrominance signal input for the output composite signal combiner 50.

An additional use for the signal at terminal $T_3'$, however, exists in the FIG. 3 arrangement: namely, application as an input to combiner 135 for subtractive combination with an uncombed version of the input composite signal. The uncombed composite signal is derived from the output of 1H delay line 31 and is fed to combiner 135 via a delay element 132 (substantially matching delay of delay element 125). With inclusion in combiner 135 of means for effecting appropriate weighting of the inputs to be combined (e.g., by a relative halving of the terminal $T_3'$ contribution, to undo the previously described doubling effect of combining), an output for combiner 135 may be developed at output terminal $T_4'$ in which the unwanted components (at odd multiples of half the line frequency) of an uncombed signal have been cancelled over the midband and highband by subtraction therefrom of a chrominance comb filter output. The signal at output terminal $T_4'$ is processed as in FIG. 1a by being coupled via delay element 42 to combiner 50 for formation of the output composite signal.

It may be noted that the uncombed lowband component of the output composite signal in the FIG. 3 arrangement has undergone a line interval delay (by virtue of passage through delay line 31), whereas the uncombed lowband component in FIG. 1*a* does not undergo such a delay (by virtue of bypassing delay line 31). An advantage of the (recorder) use of line interval delay for the lowband component, as exemplified in FIG. 3, is that it allows use of lowband bypassing of delay line structures in subsequent (player) handling of thhe buried subcarrier signal, without an exaggerated vertical separation of lowband components from other related picture components in the ultimate picture display. Such advantage will be more readily understood after consideration of additional player apparatus embodiments.

Figure 4:
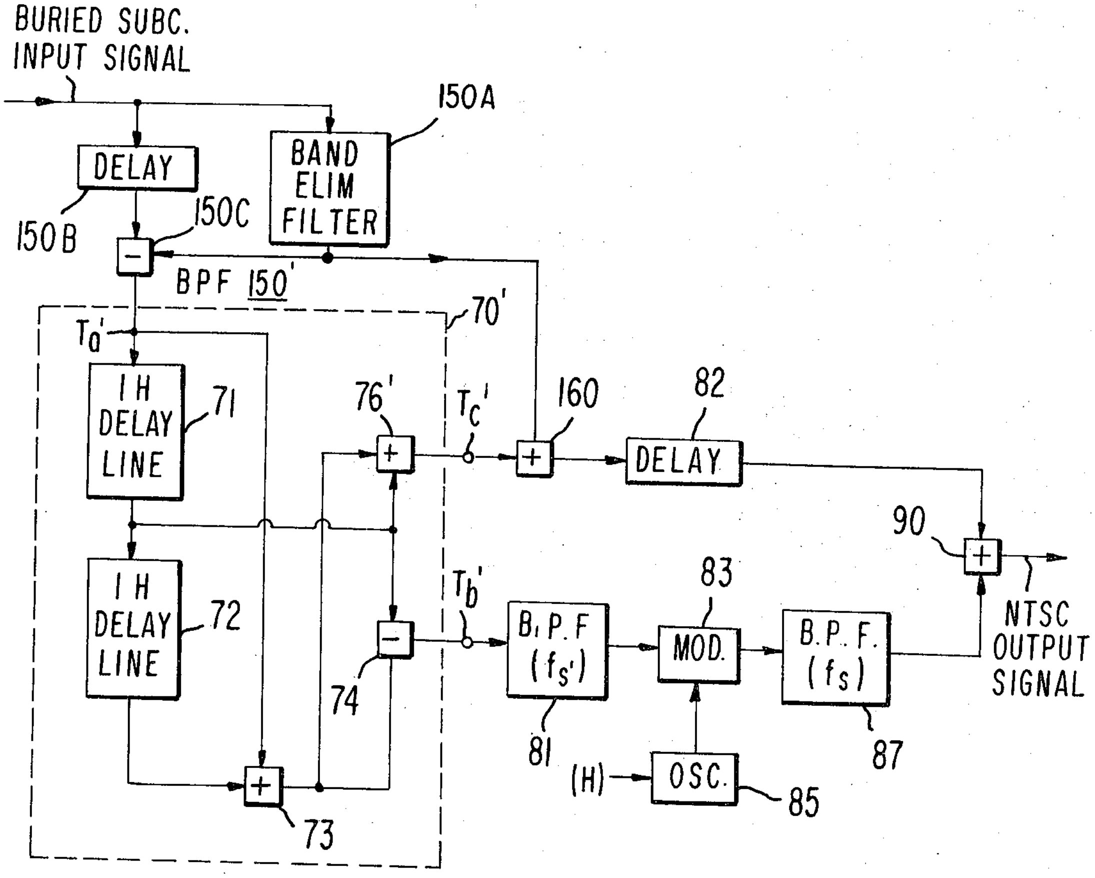
FIGS. 4, 5, 6 and 7 illustrate further embodiments of the present invention suitable for performing the player transcoding function of the apparatus of FIG. 1*b;*

In FIG. 4, a variation of the playback transcoding apparatus of FIG. 1*b* is illustrated wherein a bandpass filter confines the comb filtering apparatus input to the relatively narrow midband shared by luminance signal components and the buried subcarrier chrominance signal components; both lowband and highband components of the input signal bypass the comb filtering apparatus.

In the FIG. 4 arrangement, the input composite signal of burried subcarrier form, derived, for example, from the playback of a video disc, is applied via a band pass filter 150 to the input terminal $T_a'$ of comb filtering apparatus 70'. The band pass filter 150 is illustratively of the type employing a band elimination filter 150A responsive to the input composite signal, and a combiner 150C for subtractively combining the filter 150A output with an unfiltered version of the input composite signal passed via a delay element 150B (substantially matching the signal delay associated with filter 150A). The elimination band of filter 150A corresponds to the shared midband ($f_s' \pm 500$ KHz. for example).

The comb filter apparatus 70' employs cascaded 1H delay lines 71 and 72, combiner 73 for summing with proper weighting the delay line array input and output, and combiner 74 for subtractively combining the midpoint signal with the of combiner 73. These elements form a chrominance comb filter akin to that of FIG. 1*b* for the combiner 74 output signals appearing at filter output terminal $T_b'$. The signals at terminal $T_b'$ are processed by BPF 81, modulator 83, and BPF 87, as in FIG. 1*b*, to frequency shift the chrominance signal to the (NTSC) location desired for the output signal. BPF 81 may optionally be omitted in view of the noted comb confining effect of the input BPF 150.

Comb filter apparatus 70' also includes a combiner 76' for additively combining the midpoint signal with the output of combiner 73. These inputs are supplied directly to combiner 76', in contrast with the use of HPF 77 and delay element 75 in the FIG. 1b arrangement. The luminance comb filter output of adder 76' at filter output terminal $T_3'$ only includes midband components because of the noted confining effect of input BPF 150. These combed midband components are combined with uncombed lowband and highband components in an adder 160, the uncombined lowband and highband components being derived from the output of the band elimination filter 150A. The adder 160 output supplies a luminance signal input (via delay element 82) to the output signal combiner 90 for combination with the frequency--shifted chrominance signal output of BPF 87.

A particular advantage of the FIG. 4 arrangement is the relatively narrowband requirements (e.g., about 1 MHz. bandwidth) imposed on the comb filtering apparatus 70, which may ultimately be reflected in less expense for the 1H delay line elements.

Figure 5:
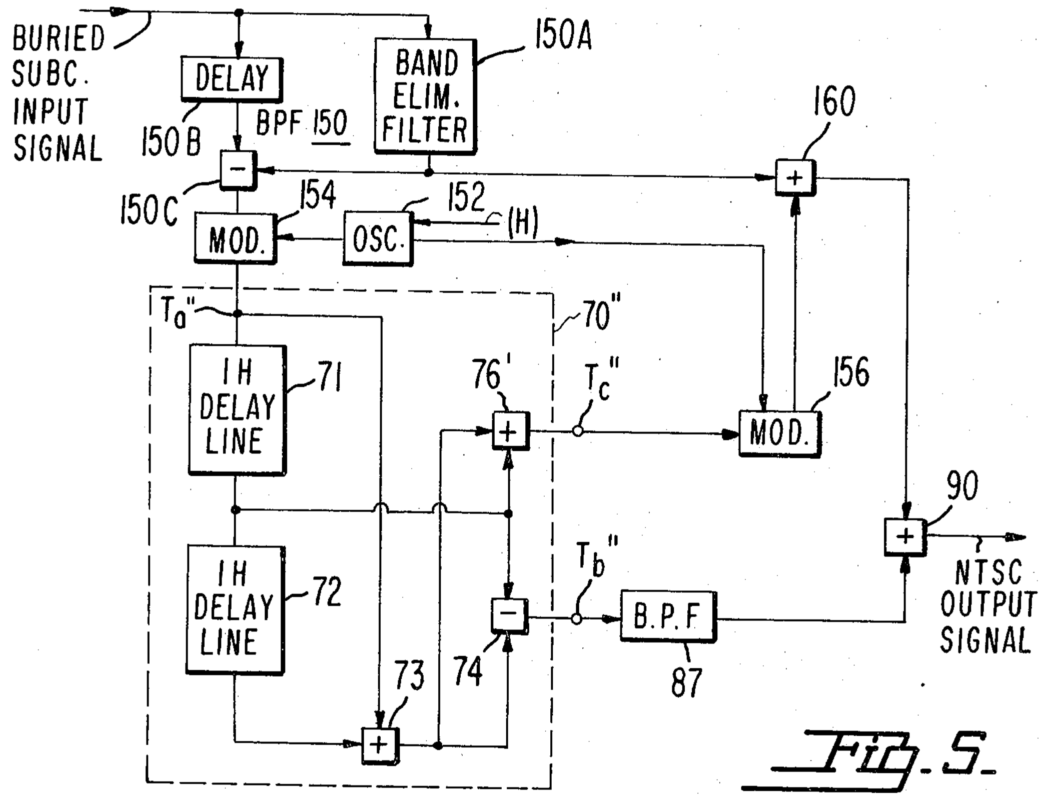

FIG. 5 illustrates a variation of the FIG. 4 arrangement wherein the above-discussed narrowband requirement advantage is retained, while introduction of frequency shifting prior to comb filtering enables use of a relatively inexpensive, commercially available narrowband form of ultrasonic delay line (exemplified by the Amperex Type DL45 1H delay line). In the FIG. 5 arrangement, the input composite signal (of buried subcarrier format) is applied to BPF 150, just as in FIG. 4. However, the output of BPF 150 is heterodyned with oscillations of the previously discussed subcarrier sum frequency (i.e., $f_s + f_s'$) from oscillator 152 in a modulator 154, illustratively of doubly balanced form.

The arrangement of components (71, 72, 73, 74 and 76') in the comb filter apparatus 70'' of FIG. 5 corresponds to their arrangement in FIG. 4. However, illustratively, the 1H delay lines 71 and 72 are of the above-mentioned DL45 form, which will pass the narrowband difference frequency product of modulation (falling illustratively in the band: 3.58 MHz. ± 500 KHz.) to the substantial exclusion of the sum frequency product of modulation. However, since one of the contributions to be combined in operation of the comb filter apparatus 70'' is an undelayed input signal, it is prudent to incorporate in modulator 154 suitable means (such as a lowpass or bandpass filter) for rejecting the sum frequency product prior to application to the comb filter input terminal $T_a''$.

Separated chrominance signal components appear at the output of subtractive combiner 74 (terminal $T_b''$) in the spectrum location desired for output signal use. Selection of these components by bandpass filter 87 simply provides the chrominance signal for application to output signal combiner 90.

Separated luminance signal components, from the shared band only, appear at the output of additive combiner 76' (terminal $T_c''$), but occupy the wrong band for output signal use (having been shifted upward from their normal midband location). Downward shifting of these luminance signal components to the correct midband location is effected by an additional heterodyning with oscillations from oscillator 152 in modulator 156. Modulator 156 is illustratively of doubly balanced form. The difference frequency product of modulation provides combed midband luminance signal components, which are added to uncombed lowband and highband components from the output of band elimination filter 150A in additive combiner 160. The output of adder 160 provides the luminance signal input to output signal combiner 90.

It may be noted that the arrangements of FIGS. 4 and 5 are illustrations of player embodiments where bypassing of delay lines by the lowband component reduces the bandwidth requirements of the delay line. Unfortunately, if such lowband bypassing at the player is effectively cascaded with similar lowband bypassing at the reccorder, the lowband components fall out of step, vertically speaking, with companion components to a noticeable degree. If, on the other hand, lowband bypassing of the delay line is avoided at the recorder, one is free to use lowband bypassing or not in the player, with a much less visible out-of-step effect in either case. The expense of a windband delay line is sensibly accepted at the recorder if it facilitates the possibility of cost-saving use of narrow band delay lines in the consumer instrument (i.e., the player).

Figure 6:
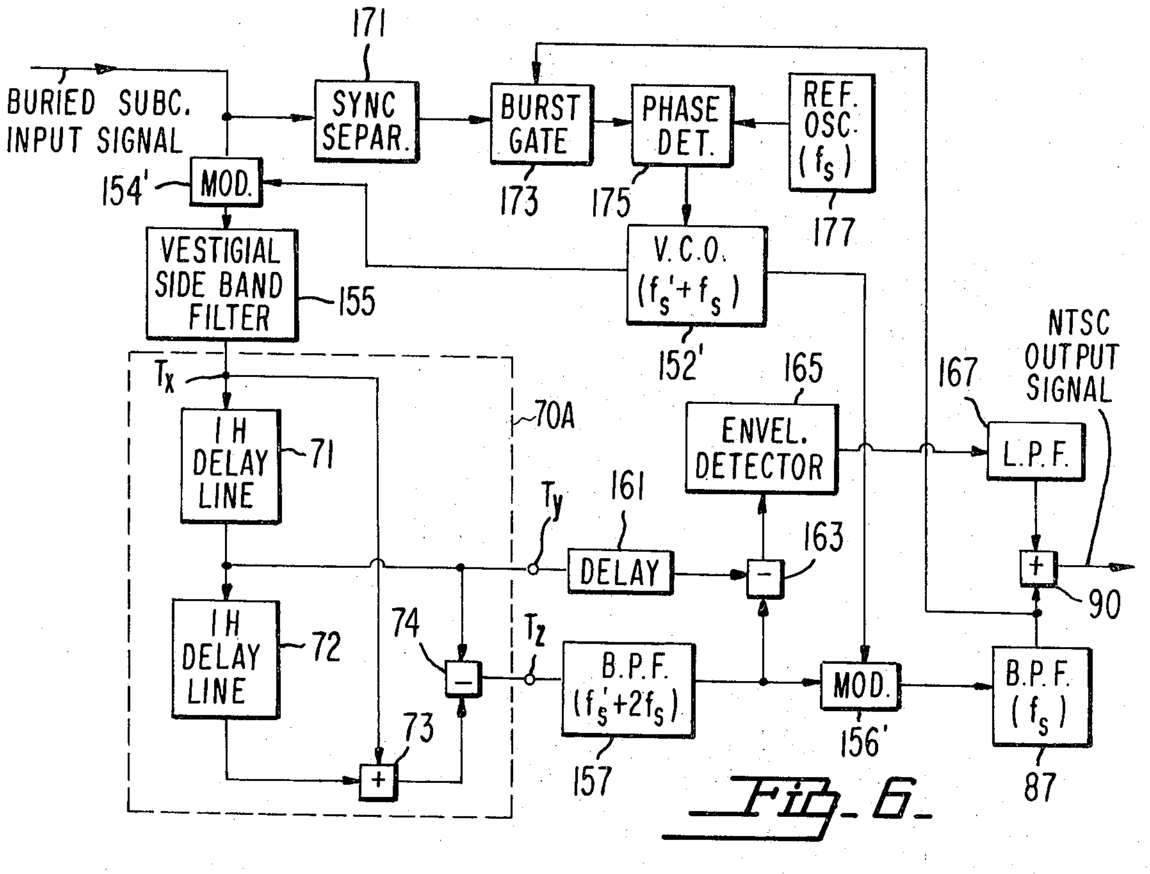

FIG. 6 illustrates a form of player transcoding apparatus in which the previously mentioned subtractive process is employed to obtain a luminance comb filter characteristic. The comb filter apparatus 70A of FIG. 6 incorporates the usual arrangements of elements 71, 72, 73 and 74 to provide a chrominance comb filter output at the output of subtractive combiner 74 (output terminal $T_z$), but incorporates no additive combiner counterpart to element 76' of FIG. 5. The midpoint signal, supplied to output terminal $T_y$, is an uncombed signal.

In operation of the FIG. 6 arrangement, the full band input composite signal is subject to heterodyning with ($f_s' + f_s$) oscillations from oscillator 152' in modulator 154', which is illustratively not carrier balanced. One of the modulation products corresponds to a carrier at a frequency of $2f_s' + 2f_s$ (e.g., approximately 10.2 MHz.), with the subcarrier falling in the lower sideband thereof at a frequency of $f_s' + 2f_s$ (e.g., approximately 8.7 MHz.). A vestigial sideband filter 155 provides a bandpass characteristic with the carrier at a midpoint on the high end slope.

The combed chrominance signal components surrounding the ($f_s' + 2f_s$) subcarrier frequency appear at output terminal $T_z$ and are selected by bandpass filter 157 for heterodyning with the ($f_s' + f_s$) output of oscillator 152' in modulator 156'. The difference frequency product, comprising chrominance signals in the desired (NTSC) band surrounding $f_s$, are selected by band pass filter 87 for application to output signal combiner 90.

The combed chrominance signal output of bandpass filter 157 is also applied to a combiner 163 for subtractive combination with an uncombed composite signal (in the up-shifted spectrum location), obtained from terminal $T_y$ via delay element 161 (substantially matching the delay of BPF 157). The output of subtractive combiner 163 is applied to an envelope detector 165. A low pass filter 167 recovers from the detector output a baseband luminance signal comprising combed midband components together with uncombed lowband and highband components. The output of filter 167 is applied to combiner 90 for formation of the desired (NTSC format) output composite signal.

FIG. 6 is illustrative of an arrangement where shifting to a relatively high band is employed so that the relatively wide band of the full composite signal appears as a small percentage of the carrier frequency. A given band-width may more readily be accommodated by an ultrasonic delay line operating at a high carrier frequency becuase the percentage variation is smaller.

FIG. 6 is also illustrative of player transcoding apparatus incorporating jitter correction prior to comb filtering, with the previously discussed advantage relative to undesired frequency variations of the input composite signal. For this purpose, oscillator 152' is illustratively a voltage controlled oscillator (VCO) responding to the output of a phase detector 175. The phase detector compares the output of a reference oscillator 177 operating at $f_s$ (illustratively, a crystal 3.58 MHz. oscillator) with the synchronizing burst output of burst gate 173. Burst gate 173, timed by line frequency impulses derived by sync separator 171 from the input composite signal, selectively passes the synchronizing burst portion (at $f_s$) of the combed chrominance signal output of BPF 87. The described arrangement is a form of phase locked loop (PLL) which tends to render the output of modulator 154' substantially free of input signal jitter, and is suitable for FIG. 5 use also.

Figure 7:
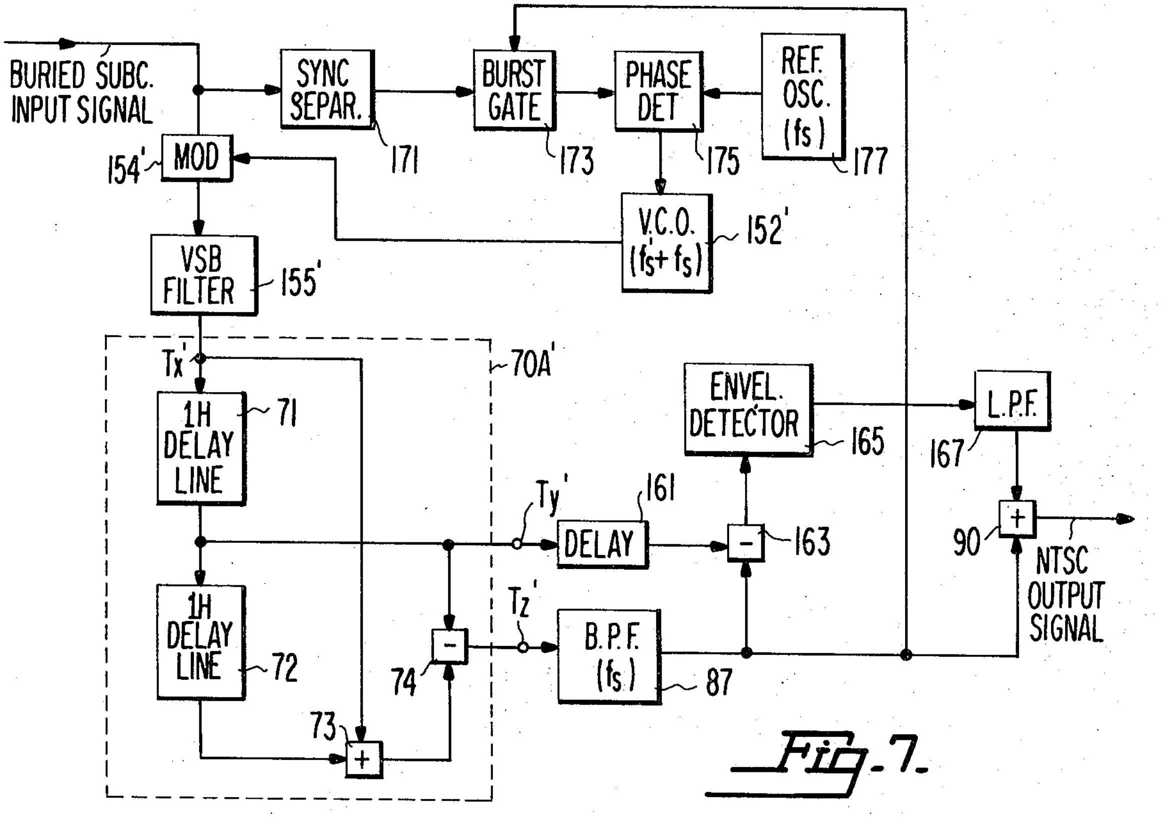

FIG. 7 illustrates a variation of the FIG. 6 embodiment in which a vestigial sideband filter 155' passes the unbalanced ($f_s' + f_s$) carrier product of a singly balanced modulator 154' (responding to input composite signal and VCO 152' output) as well as the lower sideband thereof (in which the subcarrier falls at the desired $f_s$ frequency). The bandpass characteristic of filter 155' places the ($f_s' + f_s$) carrier at the midpoint of the high end slope so that a small portion of the upper sideband is also passed. The percentage of modulation of the ($f_s' + f_s$) carrier effected in modulator 154' is held to a relatively low value.

The output of filter 155' is applied to input terminal $T_x'$ of comb filter apparatus 70A'. The internal arrangement of apparatus 70A' is similar to that of comb filter 70A of FIG. 6, with the usual arrangement of elements 71, 72, 73, 74 providing a chrominance comb filter output at terminal $T_z'$ (the output of subtractive combiner 74). However, in contrast with FIG. 6, the chrominance signal components at terminal $T_z'$ fall in the (NTSC) spectral location desired for output signal use, whereby selection thereof by band pass filter 87 directly provides the $f_s$ chrominance signal for application to output signal combiner 90.

An uncombed composite signal (the midpoint signal) appears at terminal $T_y'$ of apparatus 70A' and is applied via delay element 161 (substantially matching the delay of BPF 87) to combiner 163 for subtractive combining with the BPF 87 output. The output of combiner 163 is applied to an envelope detector 165. Low pass filtering of the detector output by LPF 167 recovers a baseband luminance signal, comprising combed midband components and uncombed lowband and highband components, suitable for application to output signal combiner 90.

The FIG. 7 arrangement also incorporates jitter correction prior to comb filtering, employing elements 171, 173, 175, 177 and 152' in a PLL system comparable to that of FIG. 6. The FIG. 7 arrangement advantageously avoids the need for the post-combing modulator (156') of the FIG. 6 arrangement.

Figure 8:
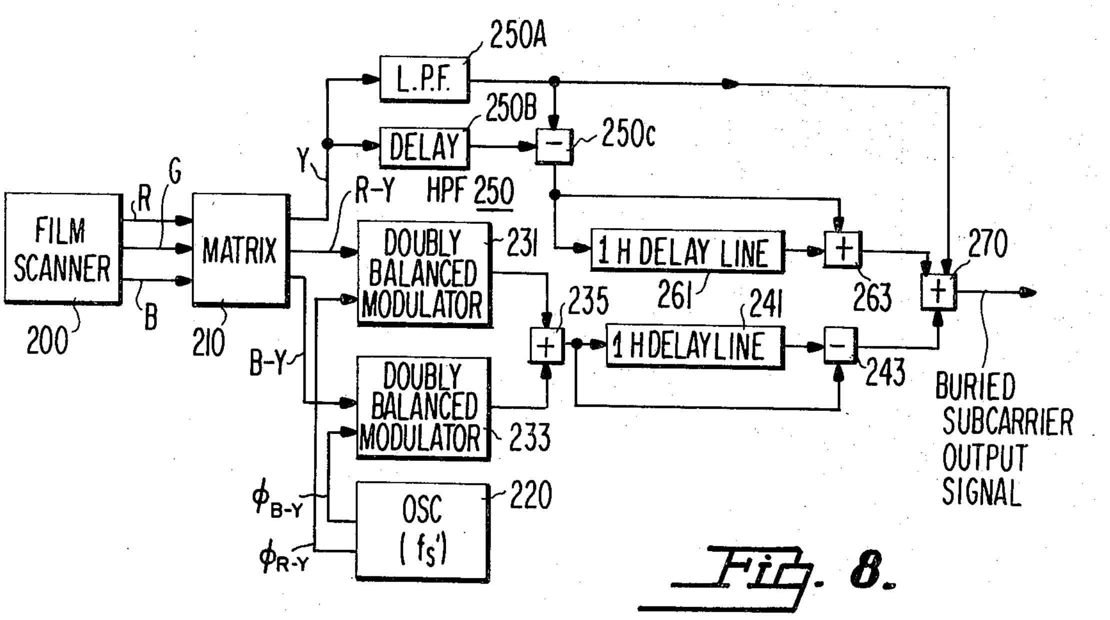
FIGS. 8 and 9 illustrate encoding apparatus embodying principles of the present invention, the apparatus being suitable for accepting a set of color signals and providing an encoded signal output in buried subcarrier form for video disc recording purposes.
Figure 9:
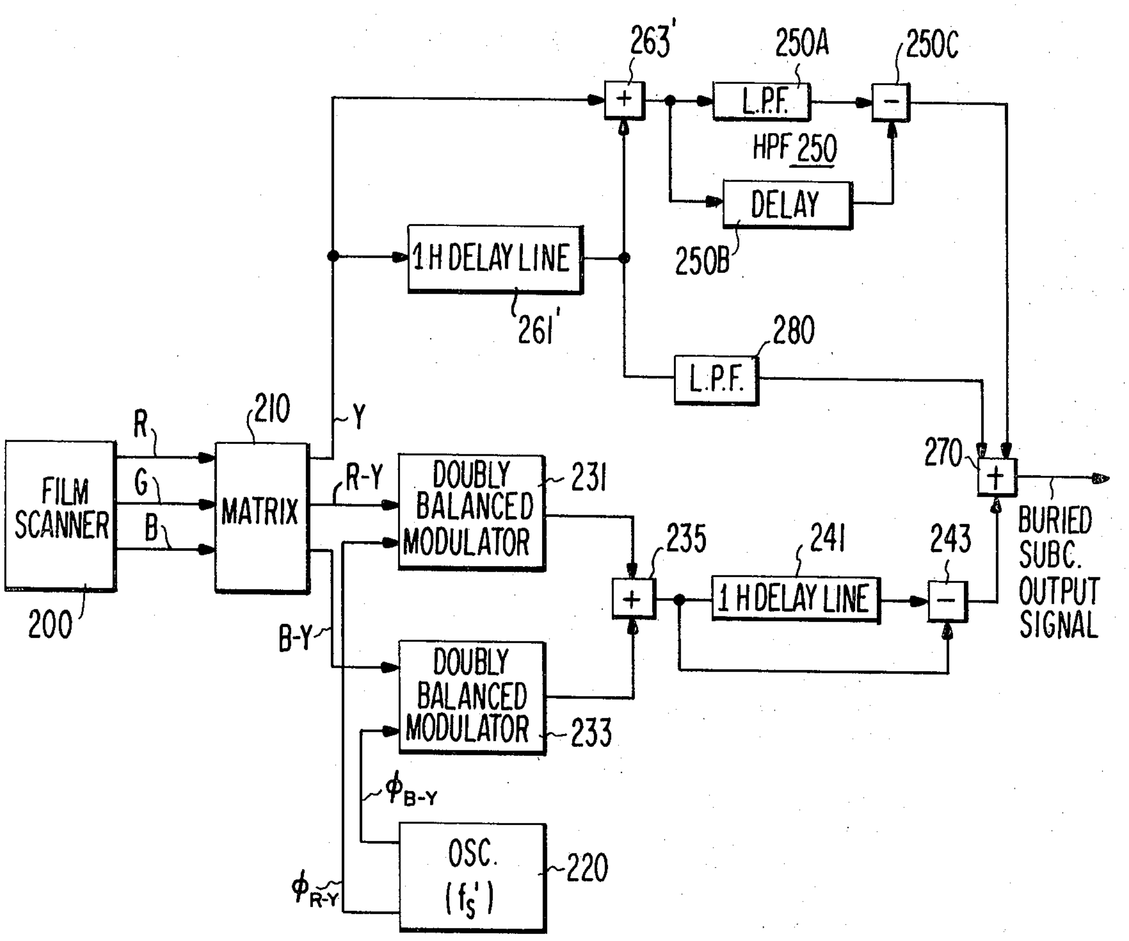

FIGS. 8 and 9 illustrate application of the principles of the present invention to systems for direct encoding of color image information into the buried subcarrier format.

In FIG. 8, an illustrative source of unencoded color image information comprises a color film scanner 200 of conventional form, providing a set of three simultaneous video signals (R, G and B), representative respectively of the red, green and blue content of a film image being scanned. The color signals are applied to conventional matrix apparatus 210 for converting the three independent input signals to a different set of three independent signal outputs of a form (R-Y, B-Y and Y, where Y = 0.3R + 0.59G + 0.11B) convenient for use in encoding.

Each of the color difference (R-Y, B-Y) signals produced by matrix 210 is applied to a respective modulator 231, 233 of doubly balanced form. Respective phases, $\phi_{R-Y}$ and $\phi_{B-Y}$ (differing by 90°), of reference oscillations at the desired buried subcarrier frequency $f_s'$(e.g., 1.534091 MHz.) are applied to the respective modulators 231 and 233. The outputs of the modulators 231 and 233 are combined by adder 235 to form a chrominance signal effectively phase modulated in accordance with hue and amplitude modulated in accordance with saturation. Illustratively, the bandwidth of each modulating color-difference signal is limited to 500 KHz. and the chrominance signal occupies a band defined by $f_s' \pm 500$ KHz.

The chrominance signal output of adder 235 is applied to comb filter apparatus comprising 1H delay line 241, and combiner 243 serving to subtractively combine the delay line input and output. The output of combiner 243 is a chrominance signal combed to pass chrominance signal components at or near odd multiples of half the line frequency, and to reject chrominance signal components at multiples of line frequency.

The luminance (Y) signal output of matrix 210 is applied to a high pass filter 250, which comprises a low pass filter 250A responsive to the Y matrix output, and a combiner 250C for subtractively combining the output of LPF 250A with an unfiltered version of the Y matrix output passed via a delay element 250B (substantially matching the delay of LPF 250A).

The cutoff frequency ($f_{co}$) of HPF 205 corresponds to the cutoff frequency of LPF 250A and is desirably chosen to be just below the lowest buried subcarrier sideband frequency (e.g., $f_{co}$ = 1 MHz.). Luminance signal components above $f_{co}$ pass from the output of combiner 250C to comb filter apparatus comprising 1H delay line 261, and a combiner 263 for additively combining the input and output of delay line 261. The output of combiner 263 is a luminance signal lacking its lowband component (O–$f_{co}$) and combed above $f_{co}$ to pass luminance signal components at or near multiples of the line frequency but to reject luminance signal components at odd multiples of half the line frequency.

The combed luminance signal components in the output of combiner 263 are additively combined with (a) an uncombed lowband component derived from the output of LPF 250A, and (b) the combed chrominance signal output of combiner 243, in the output signal combiner 270 to form a composite output signal in the buried subcarrier format desired for recording.

In the direct encoding environment exemplified by FIG. 8, the use of comb filtering for trough preparing is to be clearly seen for there is no concomitant separating action to be performed in the encoder. Crosstalk of midband diagonal luminance components into color is substantially precluded by elimination of such components from the luminance signal prior to its initial combination with chrominance information. Conversely, through diagonal coloring information can result in chrominance signal components falling at or near multiples of the line frequency, such diagonal chrominance components are substantially eliminated from the chrominance signal prior to its initial combination with luminance information. Thus each of the two signals sharing the midband in the recorded composite signal occupy only mutually exclusive portions of that band. In subsequent operations on the recorded signal at the player, the respectively interleaved luminance and chrominance signals may be separated by comb filtering without danger of diagonal type crosstalk.

Where the player operations involve transcoding into NTSC encoded form from the buried subcarrier format example heretofore recited (i.e., buried subcarrier frequency: 1.53 MHz.; shared midband 1–2 MHz.; and luminance band-width; 0–3 MHz.) subsequent color television receiver operations on the transcoded signals (even without use of a receiver comb filter) will be free from luminance crosstalk into color since the transcoded chrominance signal will lie in a band (3.08 – 4.08 MHz.) devoid of luminance information of any type.

If extension of the luminance signal cutoff frequency beyond the 3 MHz. example is employed for the recorded signal, the apparatus of FIG. 8 serves the additional function of combing out diagonal type luminance signal components in the to-be-shared high band. It will further be noted that in the direct encoding apparatus of FIG. 8 there is no built-in crosstalk from highband diagonal components (as was encountered in discussion of recorder transcoding apparatus) since there is not prior combining of luminance and chrominance information preceding the comb filtering opportunities.

FIG. 9 illustrates a modification of the encoding apparatus of FIG. 8 wherein luminance comb filtering (by elements 261', 263') precedes rather than follows high pass filtering by HPF 250. This permits the lowband luminance component input to combiner 270 to be passed (via lowpass filter 280, matching the characteristic of LPF 250A) from the output of the 1H delay line. This arrangement avoids the use at the recorder of lowband bypassing of the delay line, advantageous for its previously discussed effect on player design freedom.

It may be noted that if it is desired to comb only the shared midband of the luminance signal and to permit diagonal luminance components at frequencies thereabove to be retained in the recorded signal, this may be effected by a simple modification of the FIG. 9 apparatus: replacement of the pair of matching low pass filters (250A, 280) by a pair of matching band elimination filters each having an elimination band coextensive with the shared midband.

As discussed in the aforementioned Clemens application, slower than real time video disc recording techniques may be employed which utilize time scale expanded video signals. It should be appreciated that the encoding techniques of FIGS. 8 and 9 (as well as the transcoding techniques of FIGS. 1a, 2a and 3) may be used for slowed down video signals as well as for real time video signals, with account taken for the fact that the line frequency of the slowed down video signals corresponds to the real time line frequency divided by the time scale expansion factor.

I claim:

1. In a color image signal translating system, the combination comprising:

means for developing signals representative of only the chrominance of said color image and occupying only a given frequency band;

means for developing signals representative of only the luminance of said color image and occupying a band of frequencies inclusive of said given frequency band as well as a band of frequencies lower than and adjacent to said given frequency band;

means for processing the luminance representative signals developed by said luminance representative signal developing means to effect signal component removal at a plurality of spectral locations regularly spaced throughout said given frequency band while passing substantially all signal components thereof falling within said lower frequency band;

comb filter means responsive to the chrominance representative signals developed by said chrominance representative signal developing means for substantially confining said chrominance representative signals to components at said plurality of regularly spaced spectral locations; and means for combining the outputs of said luminance representative signal processing means and said comb filter means to form a composite signal inclusive of luminance representative signal components falling within said lower frequency band and in which luminance representative signal components and chrominance representative signal components share said given frequency band in substantially non-overlapping, interleaved relationship.

2. In a color image signal translating system, the combination comprising:

means for developing signals representative of the chrominance of said color image and occupying only a given frequency band;

a source of signals representative of the luminance of said color image and occupying a band of frequencies inclusive of said given frequency band as well as a band of frequencies lower than said given frequency band;

means for subjecting said luminance representative signals to signal component removal at a plurality of regularly spaced spectral locations throughout said given frequency band to the substantial exclusion of said lower frequency band;

said chrominance signal developing means including means for substantially confining said chrominance representative signals to components at said plurality of regularly spaced spectral locations;

means for combining the outputs of said luminance signal subjecting means and said chrominance signal developing means to form a composite signal in which luminance representative signal components and chrominance representative signal components share said given frequency band in substantially non-overlapping, interleaved relationship; and means coupled between said source and said combining means for bypassing luminance signal components in said lower frequency band around said luminance signal subjecting means whereby the composite signal formed by said combining means also includes luminance information in said lower frequency band free of the signal component removal action of said luminance signal subjecting means.

3. Apparatus in accordance with claim 2:

wherein the band occupied by luminance representative signals of said source includes frequencies in a band portion higher than said given freqency band; and wherein said combining means is responsive to luminance signal components in said higher band portion.

4. Apparatus in accordance with claim 3:

wherein said luminance signal subjecting means additionally subjects said luminance representative signals in said higher band portion to signal component removal at a further plurality of regularly spaced spectral locations in said higher band portion forming with said first plurality a continuous pattern of regularly spaced spectral locations.

5. In a color image translating system, the combination comprising:

a source of a composite signal including a signal representative of the luminance of said color image and including a first portion occupying a first frequency band and a second portion occupying a second higher frequency band, said second luminance signal portion including signal components subject to occupancy of only a first plurality of regularly spaced spectral locations extending over said second frequency band and lacking in signal components falling at a second plurality of regularly spaced spectral locations interleaved with said first plurality; said composite signal also including a signal representative of the chrominance of said color image and sharing said second frequency band with said second luminance signal portion, said chrominance signal including signal components subject to occupancy of only said second plurality of spectral locations and lacking in signal components falling of said first plurality of spectral locations;

heterodyning means responsive to the output of said source for shifting said composite signal components in frequency first comb filter means responsive to said frequency shifted composite signal and exhibiting a multiplicity of nulls at spectral locations differing from said first plurality of spectral locations by the amount of said frequency shift for developing a chrominance signal output substantially free of crosstalk from said second luminance signal portion; and second comb filter means responsive to said frequency shifted composite signal and exhibiting a multiplicity of nulls at spectral locations differing from said second plurality of spectral locations by the amount of said frequency shift for developing a luminance signal output substantially free of crosstalk from said chrominance signal.

6. In a color image translating system, the combination comprising:

a source of a composite signal including a signal representative of the luminance of said color image and including a first portion occupying a first frequency band and a second portion occupying a second higher frequency band, said second luminance signal portion including signal components subject to occupancy of only a first plurality of regularly spaced spectral locations extending over said second frequency band and lacking in signal components falling at a second plurality of regularly spaced spectral locations interleaved with said first plurality; said composite signal also including a signal representative of the chrominance of said color image and sharing said second frequency band with said second luminance signal portion, said chrominance signal including signal components subject to occupancy of only said second plurality of spectral locations and lacking in signal components falling at said first plurality of spectral locations;

first comb filter means responsive to said composite signal and exhibiting a multiplicity of nulls corresponding to said first plurality of spectral locations for developing a chrominance signal output substantially free of crosstalk from said second luminance signal portion;

second comb filter means responsive to said composite signal and exhibiting a multiplicity of nulls corresponding to said second plurality of spectral locations for developing a luminance signal output inclusive of a luminance signal portion in said second frequency band substantially free of crosstalk from said chrominance signal;

means for bypassing said first luminance signal portion around said comb filter means; and output signal forming means responsive to the outputs of said first and second comb filter means and to the output of said bypassing means.

7. In a color image signal translating system, the combination comprising:

a source of signals representative of the luminance of said color image when analyzed by a line scanning process of a given line scanning frequency, and occupying a band of frequencies inclusive of a given frequency band as well as a band of frequencies lower than said given frequency band;

means for subjecting said luminance representative signals to signal component removal at a plurality of regularly spaced spectral locations throughout said given frequency band to the substantial exclusion of said lower frequency band, each of said plurality of spectral locations substantially corresponding to a different odd integral multiple of half said line scanning frequency;

means for developing signals representative of the chrominance of said color image and occupying only said given frequency band;

said chrominance signal developing means including means for subjecting said chrominance representative signals to signal component removal at a second plurality of regularly spaced spectral locations, interleaved with said first plurality, each of said second plurality of spectral locations substantially corresponding to a different integral multiple of said line scanning frequency; and means for combining the outputs of said luminance signal subjecting means and said chrominance signal developing means to form a composite signal in which luminance representative signal components and chrominance representative signal components share said given frequency band in substantially non-overlapping, interleaved relationship.

8. In a color image signal translating system, the combination comprising:

a source of signals representative of the luminance of said color image when analyzed by a line scanning process of a given line scanning frequency, and occupying a band of frequencies inclusive of a given frequency band as well as a band of frequencies lower than said given frequency band;

means for subjecting said luminance representative signals to signal component removal at a plurality of regularly spaced spectral locations throughout said given frequency band to the substantial exclusion of said lower frequency band, each of said plurality of spectral locations substantially corresponding to a different odd integral multiple of half said line scanning frequency;

means for developing signals representative of the chrominance of said color image and occupying only said given frequency band;

said chrominance signal developing means including means for subjecting said chrominance representative signals to signal component removal at a second plurality of regularly spaced spectral locations, interleaved with said first plurality, each of said second plurality of spectral locations substantially corresponding to a different integral multiple of said line scanning frequency;

means for combining the outputs of said luminance signal subjecting means and said chrominance signal developing means to form a composite signal in which luminance representative signal components and chrominance representative signal components share said given frequency band in substantially non-overlapping, interleaved relationship; and means coupled between said source and said combining means for bypassing luminance signal components in said lower frequency band around said luminance signal subjecting means whereby the composite signal formed by said combining means also includes luminance information in said lower frequency band free of the signal component removal action of said luminance signal subjecting means.

9. Apparatus in accordance with claim 8:

wherein the band occupied by luminance representative signals of said source includes frequencies in a band portion higher than said given frequency band; and wherein said combining means is also responsive to luminance signal components in said higher band portion.

10. Apparatus in accordance with claim 8:

wherein said luminance signal subjecting means includes means for delaying signals from said source for a time interval corresponding to a line scanning period at said given line scanning frequency, and means for additively combining the output of said signal delaying means with signals from said source.

11. Apparatus in accordance with claim 10 wherein said bypassing means includes means, independent of said means for additively combining signals, for coupling the output of said signal delaying means to said first-named, composite signal forming, combining means.

12. Apparatus in accordance with claim 11 wherein said chrominance signal subjecting means includes a source of chrominance representative signals, second signal delaying means for delaying signals from said chrominance representative signal source for a time interval corresponding to a line scanning period at said line scanning frequency, and means for subtractively combining the output of said second signal delaying means with signals from said chrominance representative signal source.

13. Apparatus in accordance with claim 8:

wherein said chrominance signal subjecting means includes a source of chrominance representative signals, means for delaying signals from said chrominance representative signal source for a time interval corresponding to a line scanning period at said line scanning frequency and means for subtractively combining the output of said signal delaying means with signals from said chrominance representative signal source.

14. Apparatus in accordance with claim 13:

wherein said signal delaying means is also responsive to luminance signal components in said lower frequency band, and wherein said bypassing means includes means, independent of said means for subtractively combining signals, for coupling the output of said signal delaying means to said first-named, composite signal forming, combining means.

15. Apparatus in accordance with claim 13 including:

a signal path, independent of said subtractive signal combining means, for the output of said signal delaying means, and wherein said luminance signal subjecting means comprises second subtractive signal combining means responsive to the output of the first mentioned subtractive signal combining means and to signals appearing in said independent signal path.

16. Apparatus in accordance with claim 15 wherein said bypassing means includes said independent signal path.

17. A color image signal translating system for use with a source of an input composite signal including: a signal representative of the luminance of said color image and including a first portion occupying a given frequency band, and a second portion occupying a second frequency band, lower than said given frequency band; said first luminance signal portion including signal components subject to occupancy of only a first plurality of regularly spaced spectral locations extending over said given frequency band and lacking in signal components falling at a second plurality of regularly spaced spectral locations interleaved with said first plurality; said input composite signal also including a signal representative of the chrominance of said color image and limited to and sharing said given frequency band with said first luminance signal portion, said chrominance signal including signal components subject to occupancy of only said second plurality of spectral locations and lacking in signal components falling at said first plurality of spectral locations; said system comprising, in combination:

1. heterodyning means responsive to said input composite signal for forming an intermediate composite signal including (a) a chrominance signal corresponding to the chrominance signal of said input composite signal but shifted in frequency to occupy a third frequency band higher then said given frequency band, and (b) a luminance signal portion corresponding to said first luminance signal portion but shifted in frequency to share said third frequency band, and (c) a luminance signal portion corresponding to said second luminance signal portion but shifted in frequency above said second frequency band;
2. first comb filter means responsive to said intermediate composite signal and exhibiting a multiplicity of nulls corresponding to a third plurality of regularly spaced spectral locations in said third frequency band for developing a chrominance signal output occupying said third frequency band and substantially free of crosstalk from said frequency shifted luminance signal portions;
3. second comb filter means responsive to said intermediate composite signal and exhibiting a multiplicity of nulls corresponding to a fourth plurality of regularly spaced spectral locations, interleaved with said third plurality in said third frequency band, for developing an intermediate luminance signal substantially free of crosstalk from said frequency shifted chrominance signal;
4. means including an envelope detector responsive to said intermediate luminance signal for developing an output luminance signal including a first output luminance signal portion occupying said given frequency band and corresponding to said first input luminance signal portions, and a second output luminance signal portion occupying said second frequency band and corresponding to said second input luminance signal portion; and 5. signal utilization means for utilizing the chrominance signal output of said first comb filter means and the output luminance signal developed by said output luminance signal developing means.

18. Apparatus in accordance with claim 17 wherein said signal utilization means comprises means for combining the chrominance signal output of said first comb filter means with the output luminance signal developed by said output luminance signal developing means to form an output composite signal.

19. Apparatus in accordance with claim 18:

wherein said input composite signal also includes a third luminance signal portion occupying a fourth frequency band falling between said given frequency band and said higher third frequency band; and wherein said output luminance signal developed by said output luminance signal developing means includes a third luminance signal portion occupying said fourth frequency band and corresponding to said third input luminance signal portion.

20. Apparatus in accordance with claim 17 wherein each of said first and third pluralities of spectral locations substantially correspond to different integral multiples of a line scanning frequency associated with said color image signals, and each of said second and fourth pluralities of spectral locations substantially correspond to odd integral multiples of half said line scanning frequency.

21. In a color image signal translating system, the combination comprising:

means for developing signals representative of the luminance of said color image as analyzed by a line scanning process of a given line scanning frequency, and occupying a band of frequencies inclusive of a given frequency band as well as a band of frequencies lower than said given frequency band, and a band of frequencies higher than said given frequency band;

said luminance representative signal developing means including first comb filter means for effecting signal component removal at a plurality of regularly spaced spectral locations throughout said given frequency band to the substantial exclusion of said lower frequency band, each of said plurality of spectral locations substantially corresponding to a different odd integral multiple of half said line scanning frequency;

means for developing signals representative of the chrominance of said color image and occupying only said given frequency band;

said chrominance signal developing means including second comb filter means for effecting signal component removal at a second plurality of regularly spaced spectral locations, interleaved with said first plurality, each of said second plurality of spectral locations substantially corresponding to a different integral multiple of said line scanning frequency; and means for combining the outputs of said luminance representative signal developing means and said chrominance representative signal developing means to form a composite signal in which luminance representative signal components and chrominance representative signal components share said given frequency band in substantially non-overlapping, interleaved relationship and are subject to accompaniment by luminance representative signal components in said higher and lower bands.

22. Apparatus in accordance with claim 21 wherein the regularly spaced spectral locations at which said first comb filter means effects signal component removal extend throughout said higher frequency band in addition to said given frequency band.

23. Apparatus in accordance with claim 21 wherein said first comb filter means effects substantially no signal component removal throughout both said lower and higher frequency bands whereby substantially all luminance representative signal components falling in said lower and higher frequency bands are passed thereby to said combining means for inclusion in said composite signal.

24. A color image signal translating system for use with a source of an input composite signal including: a signal representative of the luminance of said color image and including: (a) a midband portion occupying a given frequency band, (b) a lowband portion occupying a second frequency band, lower than said given frequency band, and (c) a highband portion occupying a third frequency band, higher than said given frequency band; said input composite signal also including a signal representative of the chrominance of said color image and comprising a modulated color subcarrier having sidebands limited to and sharing said third frequency band with said highband luminance signal portion; said system comprising, in combination:

signal processing means responsive to said composite signal for effecting signal component removal therefrom at a plurality of spectral locations regularly spaced throughout both said third frequency band and said given frequency band;

means for frequency shifting to said given frequency band at least a portion of said chrominance representative signal, to the relative exclusion of said highband portion of said luminance representative signal; said frequency shifting means including: (1) a comb filter responsive to said composite signal and exhibiting a multiplicity of nulls at a second plurality of regularly spaced spectral locations, interleaved with said first-named plurality, over at least a portion of said third frequency band; (2) means for heterodyning the output of said comb filter with oscillations occurring at a frequency lying above said third frequency band; and (3) a band pass filter coupled to the output of said heterodyning means and having a passband substantially corresponding to said given frequency band; and means for combining the output of said signal processing means and said band pass filter to form an output composite signal in which midband luminance representative signal components and chrominance representative signal components share said given frequency band in substantially non-overlapping, interleaved relationship.

25. A color image signal translating system for use with a source of an input composite signal including: a signal representative of the luminance of said color image and including: (a) a midband portion occupying a given frequency band, (b) a lowband portion occupying a second frequency band, lower than said given frequency band, and (c) a highband portion occupying a third frequency band, higher than said given frequency band; said input composite signal also including a signal representative of the chrominance of said color image and comprising a modulated color subcarrier having sidebands limited to and sharing said given frequency band with said midband luminance signal portion; said system comprising, in combination:

signal processing means responsive to said composite signal for effecting signal component removal therefrom at a plurality of spectral locations regularly spaced throughout at least said given frequency band;

means for frequency shifting to a fourth frequency band, higher than said third frequency band, said chrominance representative signal, to the relative exclusion of said midband portion of said luminance representative signal; said frequency shifting means including a comb filter responsive to said composite signal and exhibiting a multiplicity of nulls at a second plurality of regularly spaced spectral locations, interleaved with said first plurality, over at least said given frequency band; and means for combining the outputs of said signal processing means and said frequency shifting means to form an output composite signal in which chrominance representative signal components lie in a frequency band separate from and above the frequency bands occupied by all of said luminance signal portions.

* * * * *